(12) United States Patent
Evans

(45) Date of Patent: Sep. 28, 2004
(10) Patent No.: US 6,798,158 B2

(54) WIND SENSING AWNING CONTROL (75) Inventor: David K. Evans, LaGrange, IN (US)

(73) Assignee: Dometic Corporation, Elkhart, IN (US)

( * ) Notice: Subject to any disclaimer, the term of this patent is extended or adjusted under 35 U.S.C. 154(b) by 4 days.

(21) Appl. No.: 10/277,322

(22) Filed: Oct. 22, 2002

(65) Prior Publication Data
US 2004/0075411 A1 Apr. 22, 2004

(51) Int. Cl.[7] .................................................. H02P 1/00
(52) U.S. Cl. ....................... 318/266; 318/286; 318/466; 318/468; 160/22; 160/45; 160/59; 160/61
(58) Field of Search ................................ 318/266, 286, 318/466, 468; 160/22, 45, 59–61

(56) References Cited

U.S. PATENT DOCUMENTS

| | | | |
|---|---|---|---|
| 2,800,018 A | 7/1957 | Phillips et al. | |
| 3,779,302 A | 12/1973 | Akers et al. | |
| 4,008,610 A | 2/1977 | Larsen et al. | |
| 4,160,458 A | * 7/1979 | Marcellus | 160/67 |
| 4,294,302 A | * 10/1981 | Ricke, Sr. | 160/133 |
| 4,537,068 A | 8/1985 | Wrobel et al. | |
| 4,615,214 A | 10/1986 | Burns | |
| 4,625,565 A | 12/1986 | Wada et al. | |
| 5,225,748 A | 7/1993 | Haring | |
| 5,307,856 A | * 5/1994 | Murray | 160/70 |
| 5,314,153 A | 5/1994 | White | |
| 5,621,295 A | 4/1997 | Vanderschaeghe et al. | |
| 5,850,131 A | 12/1998 | Wolfer et al. | |
| 6,111,376 A | 8/2000 | Jean-Marc | |
| 6,573,676 B1 | * 6/2003 | Klesing | 318/445 |

OTHER PUBLICATIONS

Raouf Ismail, "Air Velocity Measurement Using Thermistors", Cambridge AccuSense, Inc., pp. 1–4.

* cited by examiner

Primary Examiner—Rina Duda
(74) Attorney, Agent, or Firm—Pearne & Gordon LLP (57) ABSTRACT

A awning control circuit and assembly including an ambient thermistor and a heated thermistor for sensing wind speed. A microprocessor determines the present wind speed by referencing values of the thermistors to a stored lookup table. When the wind speed meets or exceeds a threshold value, the microprocessor causes one or more awnings to retract.

38 Claims, 5 Drawing Sheets

WIND SENSING AWNING CONTROL

BACKGROUND OF THE INVENTION

The present invention relates generally to motorized roll-type awning with automatic controls, and more specifically to an awning controller with solid-state wind velocity sensing.

Roll-up sun shades or awnings are often provided on mobile homes and other structures. It is well known to provide electric motors which extend and retract such roll-up awnings. Further, automatic controls may be associated with such sun shades which, in conjunction with limit switches or sensors, to automatically stop when the awning is fully retracted or fully extended.

It is further known to provide a mechanical wind sensor to further control the operation of the awning motor. Since excessive wind can cause damage to the awning fabric or mechanism, it is desirable for the extension and retraction of the awning to be controlled based upon wind velocity.

One such wind-controlled awning is disclosed in U.S. Pat. No. 5,225,748 to Haring. This awning includes wind sensing, such as by an anemometer which senses wind velocity. The awning control allows for incremental positioning of the awning throughout the entire length of extension and retraction travel at predetermined positions. The awning is retracted to a particular position depending on the wind velocity.

Conventional mechanical anemometers, such as cup anemometers, include a rotating assembly having a vertical axis and three cups which capture the wind. The number of revolutions per minute is used to determine wind velocity.

Another wind-controlled awing is disclosed in U.S. Pat. No. 6,111,376 to Jean-Marc. This awning does not directly measure the wind velocity, but senses torque on the awning roll drive motor to determine the magnitude of wind. Magnitudes of torque sensed at the drive motor provide an indication of wind velocity and are used to limit the length of which the awning may be extended. However, since wind is only sensed while the awning fabric is being extended by the motor, such awnings are not capable of automatically retracting the awning fabric when dangerous wind levels are present.

SUMMARY OF THE INVENTION

The present invention provides an automatically retracting awning assembly. The awning assembly comprises a powered awning retracting mechanism and a wind sensor. The wind sensor comprises an ambient temperature sensor disposed to measure an ambient temperature of wind and output an ambient temperature signal, and a heated temperature sensor disposed to measure the cooling effect of the wind and output a heated temperature signal. The awning assembly further comprises a controller for controlling the awning in response to the wind sensor by deducing a current wind speed based upon the ambient temperature signal and the heated temperature signal, wherein the controller causes the awning to retract when the current wind speed reaches a set threshold level.

DETAILED DESCRIPTION OF THE PRESENT INVENTION

With reference to FIGS. 1–6, 7A and 7B, an embodiment of the present invention is shown and described. The present invention relates to an awning control 10 for controlling one or more awnings 8A, 8B of a recreational vehicle 6. The awning control 10 includes a wind speed sensor 12 mounted on the recreational vehicle for automatically closing the awnings in response to high winds. The wind speed sensor 12 comprises a sensor housing 14, a sensor mounting structure 16 and a wind speed sensing circuit 18.

As best shown in FIGS. 2–6, the sensor housing 14 comprises a housing base 20 and a housing cover 22. A plurality of pillars 24 extending from the housing base 20 support and space the housing cover 22 away from the base 20. A wind speed sensing zone 26 is thus defined in the space between the housing base 20 and the housing cover 22.

An upper circuit board 28 is provided within the housing cover 22. A first thermistor 30 and a second thermistor 32 are mounted to the upper circuit board 28 and extend through a first thermistor hole 34 and a second thermistor hole 36, respectively, into the wind speed sensing zone 26. The first thermistor 30 acts as an ambient temperature sensor measuring a temperature of wind in the sensing zone 26 for the purpose of temperature compensation. The second thermistor 32 is a heated temperature sensor that senses a cooling effect over a period of time caused by wind passing through the sensing zone. As explained in detail below, the wind speed is determined based upon the amount of cooling of the second thermistor 32 for a given wind temperature measured by the first thermistor 30.

The upper circuit board 28 is connected to a lower circuit board 38 located within the housing base 20 by way of four wires 40 passing through the pillars 24. A female RJ-11 connector 42 is provided on the bottom of the lower circuit board 38. A corresponding male RJ-11 connector 44 is provided on the sensor mounting structure 16. By way of the connections between the upper circuit board 28, the lower circuit board 38 and the RJ-11 connectors 42, 44, the first and second thermistors 30, 32 are connected to the wind speed sensing circuit 18 located within the recreational vehicle. By way of the RJ-11 connectors, the wind sensor is removably mounted to the sensor mounting structure. Further, two mounting bosses 46 extend from the bottom of the housing base 20 and cooperate with two corresponding boss receiving holes 48 in the sensor mounting structure 16.

Figure 7A:
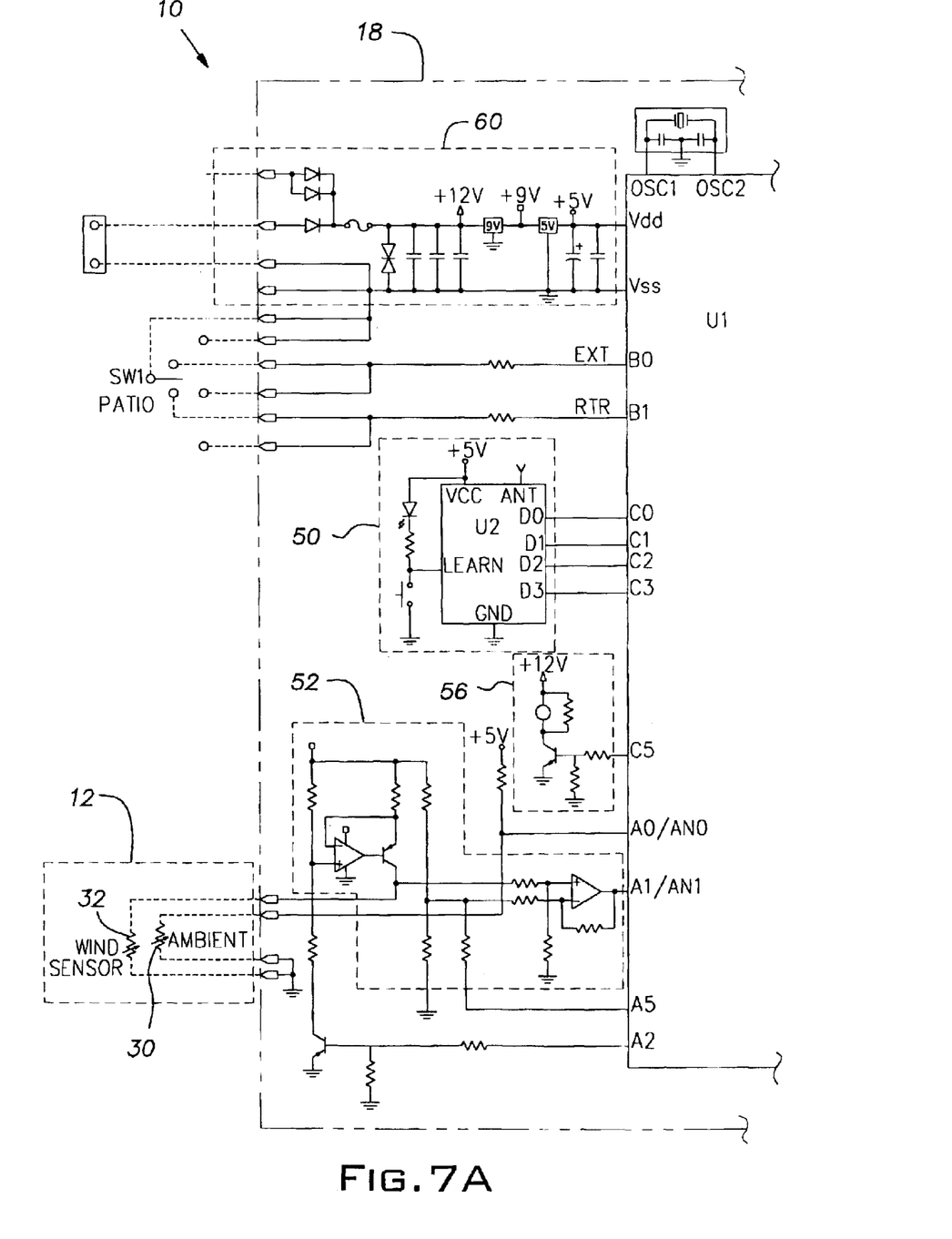
FIGS. 7A and 7B are a schematic circuit diagram of a awning control according to the present invention.
Figure 7B:
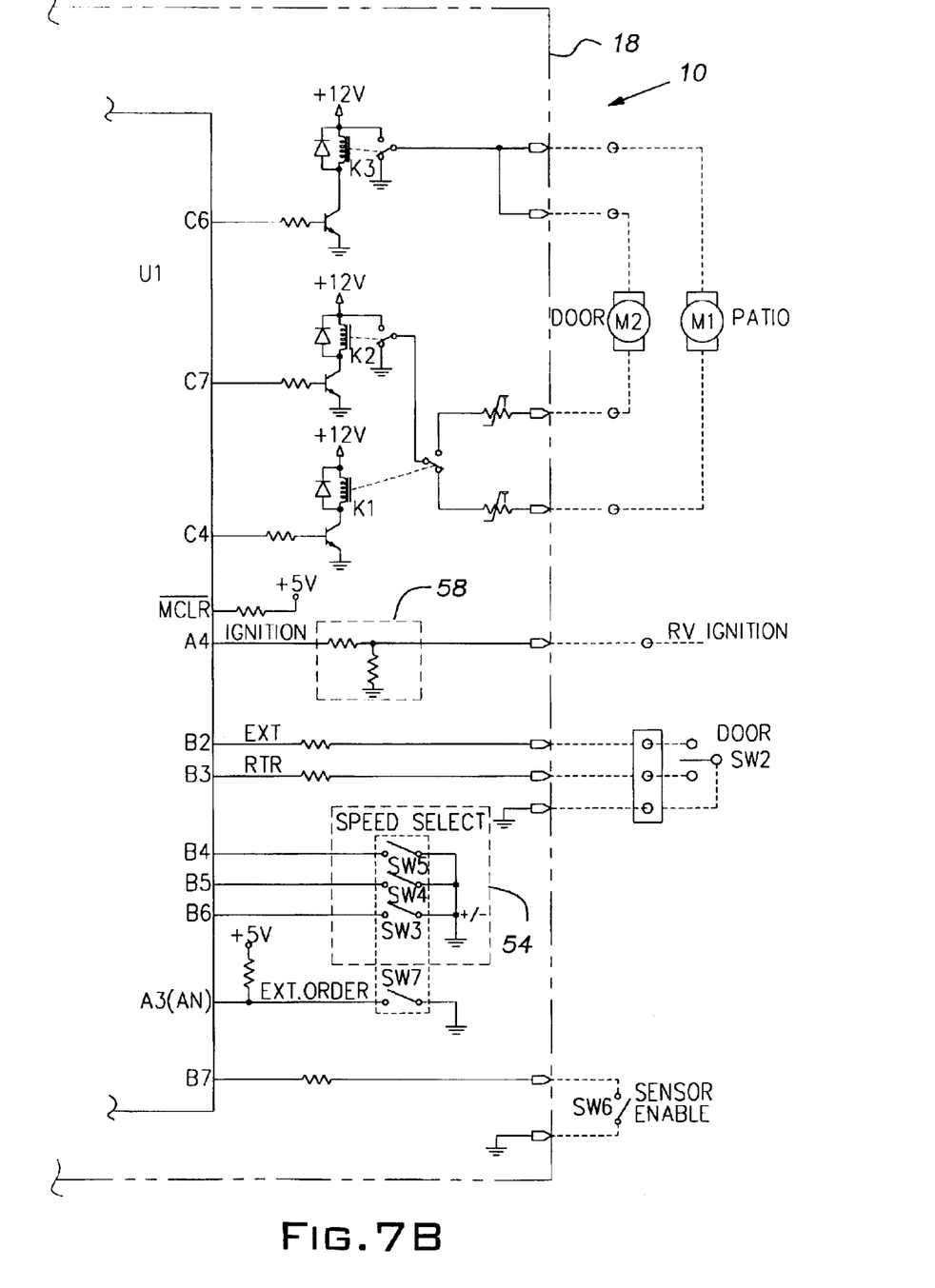

Referring to FIGS. 7A and 7B, in the present embodiment, two roll-type awnings 8A, 8B (FIG. 1) are respectively powered for extension and retraction by a first motor M1 and a second motor M2. A microprocessor U1 control the operation of the motors M1, M2 based upon various inputs and parameters as described below in detail.

Figure 1:
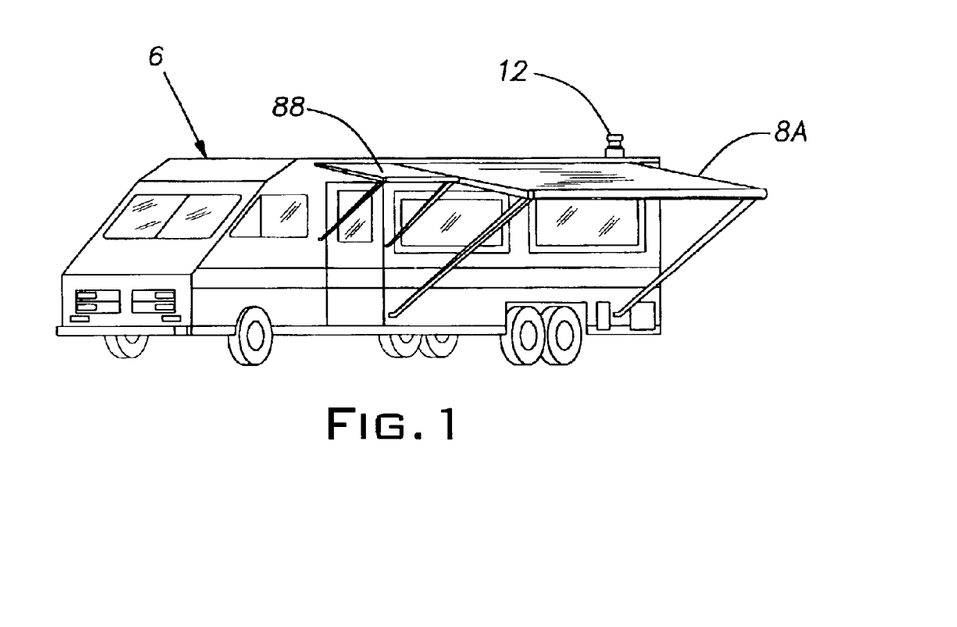
FIG. 1 is a recreational vehicle having a wind sensor assembly according to the present invention.
Figure 2:
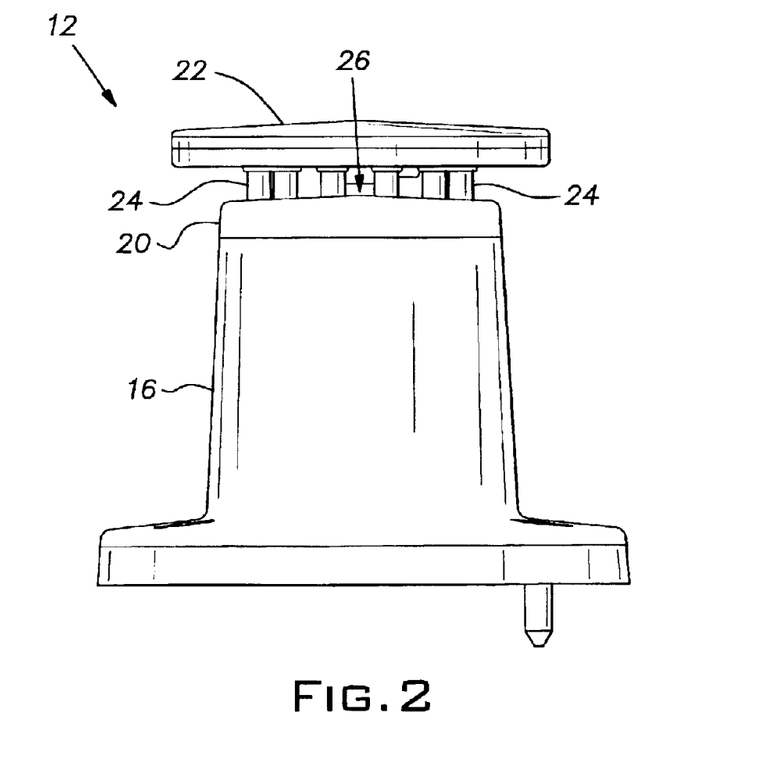
FIG. 2 is a front elevational view of a wind sensor assembly according to the present invention.
Figure 3:
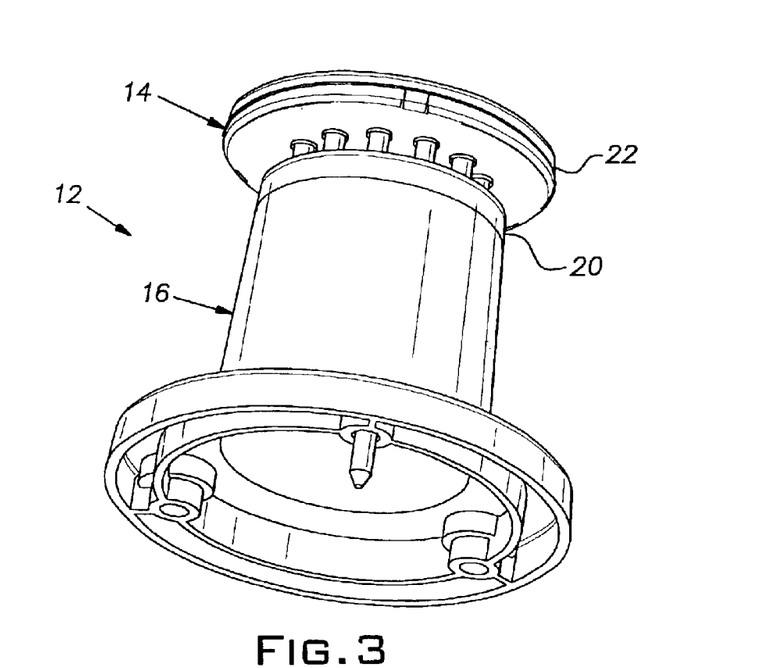
FIG. 3 is a perspective view of the wind sensor assembly of FIG. 2.
Figure 4:
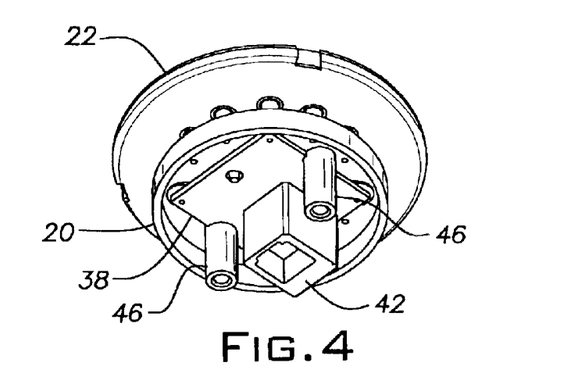
FIG. 4 is a bottom perspective view of a wind sensor portion of the assembly of FIG. 2.
Figure 5:
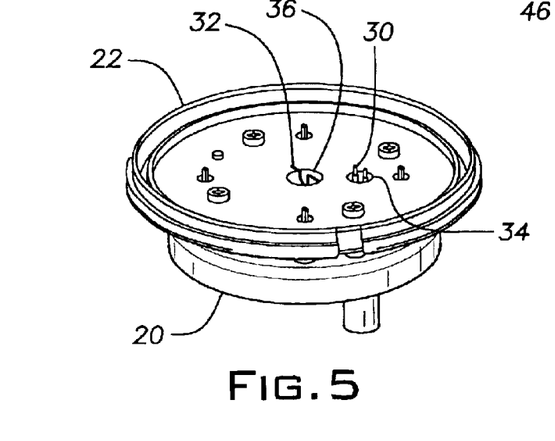
FIG. 5 is a top perspective view of the wind sensor of FIG. 4 having a top surface removed for illustration.
Figure 6:
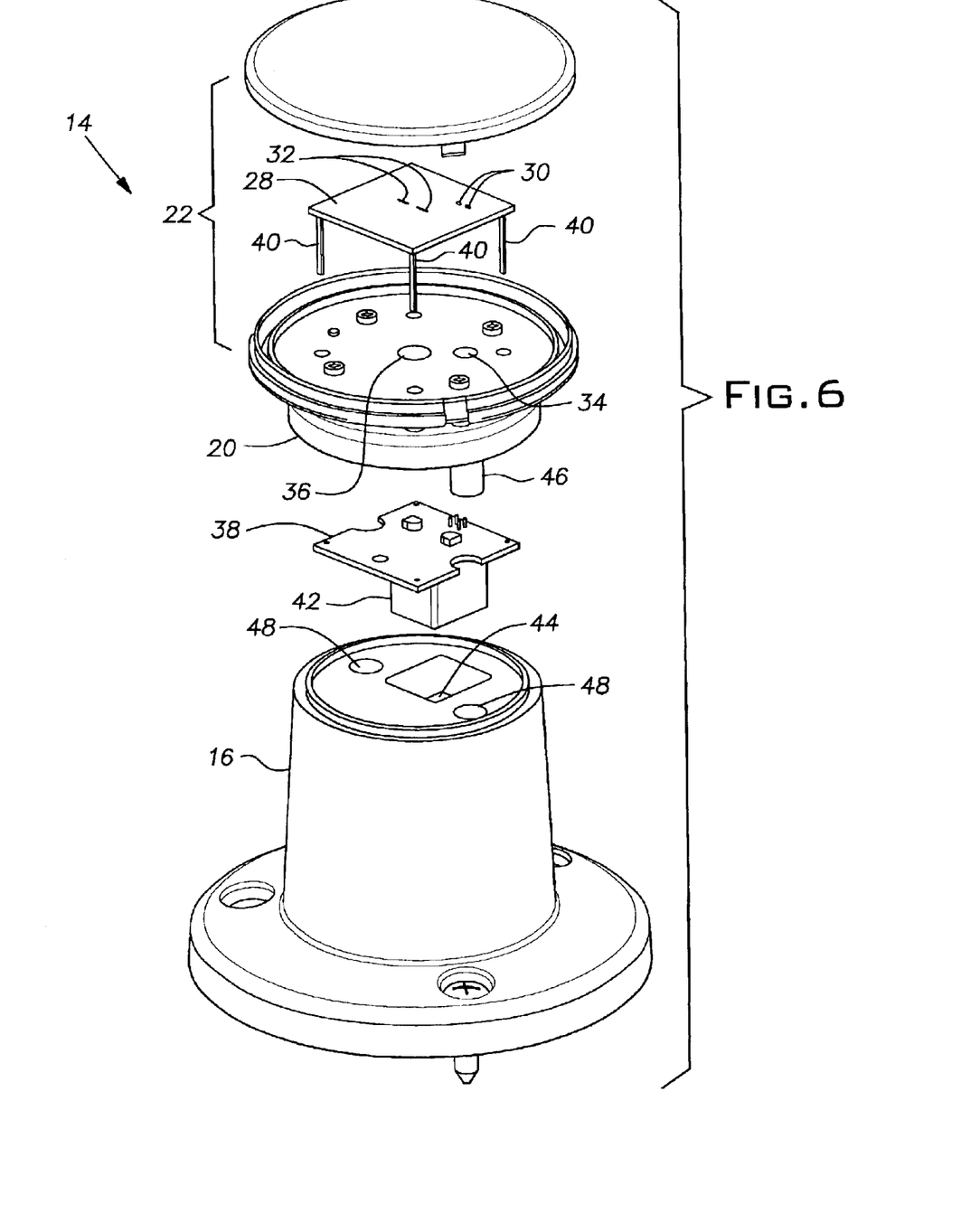
FIG. 6 is a exploded perspective view of the wind sensor assembly of FIG. 2.

Wired remote control switches SW1, SW2 are provided for respectively opening and closing of the first awning 8A and the second awning 8B (FIG. 1). A wireless remote control circuit 50 comprising a radio frequency (RF) receiver integrated circuit module U2 is also provided as an alternative means for opening and closing of the first awning 8A and the second awning 8B (FIG. 1). A remote control transmitter (not shown) is used to operate the RF module U2.

A first relay K1 is provided for selectively connecting power to one of the first motor M1 and the second motor M2. A second relay K2 and a third relay K3 are provided for controlling the direction of either the first motor M1 or the second motor M2. The direction of the motors M1, M2 is controlled by the polarity of the power provided. Thus, the second and third relays K2, K3 are each connected to a side of the motors' coils. Each relay K2, K3 selectively connects the respective side of the motors to either +12 V or to ground, thereby selecting the direction of operation of the motors M1, M2. When both sides of the motors M1, M2 are connected to ground through the relays K2, K3, a braking action of the motors M1, M2 is caused. Alternatively, the relays could be replaced with other switching elements, such as transistor, triacs, optoisolators and the like.

The first and second thermistors 30, 32 are connected to the microprocessor U1 for providing an indication of current wind speed. A thermistor control circuit 52 is provided between the second thermistor 32 and the microprocessor U1 for heating the second thermistor 32 to a predetermined temperature. The microprocessor can cause the thermistor control circuit 52 to heat the second thermistor 32 by providing an output at A2. The heating is stopped by output A5.

The resistance of the first thermistor 30, which is proportional to its temperature, is read by the microprocessor at A0. The resistance of the second thermistor 32, which is proportional to its temperature, is read by the microprocessor at A1.

A speed selecting switch assembly 54 is connected to inputs B4, B5 and B6 of the microprocessor U1 for setting a threshold wind speed. The threshold speed is set at a nominal level, such as 18 miles per hour (mph). A first switch SW3 of the switch assembly 54 selects add or subtract. Second and third switches SW4, SW5 select the amount to add or subtract to the nominal level. The second switch SW4 adds or subtracts a first amount, such as 6 mph and the third switch SW4 adds or subtracts a second amount, such as 3 mph. Thus, in the given example, by various combinations of the switches SW3, SW4, SW5 of the speed selecting switch assembly 54, threshold speeds of 9, 12, 15, 18, 21, 24, and 27 mph can be selected.

A beeper circuit 56 is connected to an output C5 of the microprocessor U1 to provide an audible alert. An ignition interlock circuit 58 is connected to an ignition circuit (not shown) of the recreational vehicle to allow the microprocessor U1 to read the state of the ignition at input A4.

Operation of the microprocessor in response to the wired remote switches SW1 and SW2 is as follows. When the first wired remote switch SW1 selectively connects power to either input B0 or input B1, the microprocessor causes, via output C4, the first relay K1 to connect the second relay K2 to the first motor M1. If the first wired remote switch SW1 is powering input B0 then the microprocessor U1, via output C7, causes the second relay K2 to connect the first motor M1 to +12 V, causing the first awning 8A (FIG. 1) to extend. Likewise, if the first wired remote switch SW1 is powering input B1 then the microprocessor U1, via output C6, causes the third relay K3 to connect the first motor M1 to +12 V, causing the first awning 8A (FIG. 1) to retract.

The second wired remote switch SW2 operates in a similar fashion to the first wired remote switch SW1, except that it causes the first relay K1 to connect the second relay K2 to the second motor M2 for operation of the second awning 8B (FIG. 1).

The wireless remote circuit 50 operates similarly to the wired remote switches SW1, SW2. In response to input C0 the microprocessor U1 causes the first awning 8A (FIG. 1) to extend, and in response to input C1, the microprocessor U1 causes the first awning 8A (FIG. 1) to retract. Likewise, in response to input C2, the microprocessor U1 causes the second awning 8B (FIG. 1) to extend, and in response to input C3, the microprocessor U1 causes the second awning 8B (FIG. 1) to retract.

Operation of the microprocessor U1 in response to the wind sensor 12 is as follows. In order to take a wind speed measurement, the microprocessor U1 activates the heating of the second thermistor 32 at output A2. When the second thermistor 32 reaches a predetermined temperature, such as 80° C., the microprocessor U1 turns off the heating at output A5. After a predetermined amount of time, such as 5 seconds, the microprocessor then reads the resistance value of the first and second thermistors 30, 32 at inputs A0 and A1. The drop in temperature of the second thermistor 32 over the predetermined time is indicative of wind speed, as corrected by the ambient temperature measurement represented by the resistance of the first thermistor 30. Since thermistors are neither linear nor consistent from thermistor to thermistor, a lookup table is created in advance for a particular sensor 12, such as in the factory, by taking the above measurements over a range of known wind speeds and a range of known temperatures. The microprocessor U1 then used the lookup table to determine actual wind speed based on the ambient temperature measurement and the drop in temperature of the heated thermistor 32. Thus, the cooling effect of the wind on the second thermistor 32 can be correlated to wind speed.

This wind speed determination is performed repeatedly at a set interval, for example, every two seconds. Each current wind speed value thus retrieved from the lookup table is stored in a cumulative table in a storage device, such as random access memory (RAM) device. A value n is equal to the number of current wind speed values retained in the cumulative table in a first in, first out (FIFO) manner. A cumulative wind speed value is determined by summing the last n values in the table. A cumulative average wind speed is then determined by dividing the wind speed values stored in the table by n.

The cumulative average wind speed is then compared to the threshold wind speed value set by the speed selecting switch assembly 54. If the cumulative average wind speed is equal to or greater than the threshold wind speed, the microprocessor automatically causes at least one of the first awning 8A and the second awning 8B (FIG. 1) to close. Since the awnings 8A, 8B are closed in response to a cumulative average wind speed, rather than a single measurement, a brief gust of wind which exceed the threshold wind speed will not cause the awnings 8A, 8B to retract unless the magnitude of the gust is great enough to cause the cumulative average to exceed the threshold wind speed.

Alternatively, the summed cumulative wind speed value can be compared to a cumulative threshold value, thus eliminating the need for calculating an average wind speed.

Sensor enable switches SW6 and SW7 are provided to allow the user to enable or disable the automatic operation of the awnings in response to high winds. If the first sensor enable switch SW6 is closed, shorting input B7 of the microprocessor U1 to ground, then the first awning 8A (FIG. 1) may be automatically closed in response to wind speed. Likewise, if the second sensor enable switch SW7 is closed, shorting input A3 of the microprocessor U1 to ground, then the second awning 8B (FIG. 1) may be automatically closed in response to wind speed.

Further, the microprocessor U1 detects at input A4 that the ignition switch of the recreational vehicle has been activated and automatically closes at least one of the first awning 8A (FIG. 1).

If the microprocessor U1 loses communication with the wind sensor 12, the microprocessor activates the audible alert notifying that the wind sensor 12 is not present or is not functioning properly.

A power supply circuit 60 supplies operating power to the first motor M1, the second motor M1, the wireless remote control circuit 50, the thermistor control circuit 52 and the microprocessor U1.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An automatically retracting awning assembly comprising:
    a powered awning retracting mechanism;
    a wind sensor comprising: an ambient temperature sensor disposed to measure an ambient temperature of wind and output an ambient temperature signal, and a heated temperature sensor disposed to measure the cooling effect of the wind and output a heated temperature signal; and
    a controller for controlling the awning in response to the wind sensor by deducing a current wind speed based upon the ambient temperature signal and the heated temperature signal, wherein the controller causes the awning to retract when the current wind speed reaches a set threshold level.

2. The awning assembly according to claim 1, wherein the controller deduces wind speed by using a lookup table.

3. The awning assembly according to claim 1, wherein the controller repeatedly deduces the current wind speed, wherein n is a number of measurements, and wherein the controller causes the awning to retract only when a cumulative average of the n most recent measurements of the current wind speed exceeds the set threshold level.

4. The awning assembly according to claim 1, wherein the ambient temperature sensor comprises a first thermistor and the heated temperature sensor comprises a second thermistor.

5. The awning assembly according to claim 1, wherein the threshold level is adjustable.

6. A wind sensor and controller assembly for automatically controlling an awning motor of a retractable awning according to wind speed, the assembly comprising:
    a sensor housing comprising a housing base and a housing cover;
    a sensor mounting structure for removably receiving the housing;
    an ambient temperature sensor disposed to measure an ambient temperature of wind and output an ambient temperature signal, the ambient temperature sensor positioned between the housing base and the housing cover;
    a heated temperature sensor disposed to measure the cooling effect of the wind and output a heated temperature signal, the heated temperature sensor positioned between the housing base and the housing cover; and
    a controller for controlling the awning in response to the wind sensor by deducing a current wind speed based upon the ambient temperature signal and the heated temperature signal, wherein the controller causes the awning to retract when the current wind speed reaches a set threshold level.

7. The awning assembly according to claim 6, wherein the controller deduces wind speed by using a lookup table.

8. An automatic control assembly for controlling an awning of a recreational vehicle, the assembly comprising:
    a wind speed sensing zone;
    a first temperature sensor for measuring a temperature of wind in the sensing zone;
    a second temperature sensor for sensing a cooling effect over time of wind in the sensing zone;
    a motor for opening and closing the awning;
    a relay for selectively setting a polarity of power supplied to the motor;
    a microprocessor for causing the relay to control the opening and closing of the awning, wherein the microprocessor receives input from the first temperature sensor and the second temperature sensor, determines a corresponding wind speed value, and automatically causes the awning to close when the corresponding wind speed value reaches or exceeds a threshold wind speed; and
    a power supply circuit for supplying operating power to the motor and the microprocessor.

9. The awning assembly according to claim 8, wherein the controller determines the wind speed value by using a lookup table.

10. The assembly according to claim 8, further comprising:
    a sensor housing comprising a housing base and a housing cover; and
    a sensor mounting structure for removably receiving the housing;
    wherein the wind speed sensing zone is located between the housing base and the housing cover.

11. The assembly according to claim 8, wherein the first temperature sensor is a first thermistor being positioned within the sensing zone and the second temperature sensor is a second thermistor being positioned within the sensing zone.

12. The assembly according to claim 11, further comprising a thermistor control circuit for heating the second thermistor to a predetermined temperature.

13. The assembly according to claim 8, further comprising a speed selecting switch assembly for setting the threshold wind speed.

14. The assembly according to claim 8, further comprising a wired remote control for opening and closing of the awning, wherein the microprocessor causes the relay to control the opening and closing of the awning in response to inputs received from the wired remote control.

15. The assembly according to claim 8, further comprising a wireless remote control circuit for opening and closing of the awning, wherein the microprocessor causes the relay to control the opening and closing of the awning in response to inputs received from the wireless remote control circuit.

16. The assembly according to claim 8, further comprising an ignition interlock circuit connected to an ignition circuit of the recreational vehicle, wherein the microprocessor automatically closes at the awning in response to an ignition signal received from the ignition interlock.

17. The assembly according to claim 8, further comprising an audible alert, wherein the microprocessor activates the audible alert if one of the first temperature sensor and the second temperature sensor are not functioning properly.

18. The assembly according to claim 8, further comprising a sensor enable switch for selectively enabling and disabling the automatic closing of the awning by the microprocessor.

19. An automatically retracting awning assembly comprising:
 a powered awning retracting mechanism;
 a wind sensor; and
 a controller for controlling the awning in response to the wind sensor by repeatedly deducing a current wind speed using the wind sensor, and wherein the controller causes the awning to retract when a cumulative value based on prior measurements of the current wind speed exceeds a set threshold level.

20. The awning assembly according to claim 19, wherein the wind sensor comprises:
 an ambient temperature sensor disposed to measure an ambient temperature of wind and output an ambient temperature signal; and
 a heated temperature sensor disposed to measure the cooling effect of the wind and output a heated temperature signal;
 wherein the current wind speed is deduced by the controller based upon the ambient temperature signal and the heated temperature signal.

21. The awning assembly according to claim 19, wherein n is a number of measurements, and wherein the cumulative value is based on the n most recent measurements of the current wind speed.

22. The awning assembly according to claim 21, wherein the n current wind measurements are stored in a storage device by the controller.

23. The awning assembly according to claim 19, wherein the cumulative value is a cumulative average.

24. The awning assembly according to claim 20, wherein the ambient temperature sensor comprises a first thermistor and the heated temperature sensor comprises a second thermistor.

25. The awning assembly according to claim 19, wherein the threshold level is adjustable.

26. The awning assembly according to claim 19, wherein the controller deduces wind speed by using a lookup table.

27. An automatic control assembly for controlling an awning of a recreational vehicle, the assembly comprising:
 a wind speed sensing zone;
 a first temperature sensor for measuring a temperature of wind in the sensing zone;
 a second temperature sensor for sensing a cooling effect over time of wind in the sensing zone;
 a motor for opening and closing the awning;
 a relay for selectively setting a polarity of power supplied to the motor;
 a microprocessor for causing the relay to control the opening and closing of the awning, wherein the microprocessor receives input from the first temperature sensor and the second temperature sensor, determines a corresponding wind speed value, determines a cumulative average wind speed value and automatically causes the awning to close when the cumulative average wind speed value reaches or exceeds a threshold wind speed; and
 a power supply circuit for supplying operating power to the motor and the microprocessor.

28. The awning assembly according to claim 27, wherein the controller determines the wind speed value by using a lookup table.

29. The assembly according to claim 27, further comprising:
 a sensor housing comprising a housing base and a housing cover; and
 a sensor mounting structure for removably receiving the housing;
 wherein the wind speed sensing zone is located between the housing base and the housing cover.

30. The assembly according to claim 27, wherein the first temperature sensor is a first thermistor being positioned within the sensing zone and the second temperature sensor is a second thermistor being positioned within the sensing zone.

31. The assembly according to claim 30, further comprising a thermistor control circuit for heating the second thermistor to a predetermined temperature.

32. The assembly according to claim 27, further comprising a speed selecting switch assembly for setting the threshold wind speed.

33. The assembly according to claim 27, further comprising a wired remote control for opening and closing of the awning, wherein the microprocessor causes the relay to control the opening and closing of the awning in response to inputs received from the wired remote control.

34. The assembly according to claim 27, further comprising a wireless remote control circuit for opening and closing of the awning, wherein the microprocessor causes the relay to control the opening and closing of the awning in response to inputs received from the wireless remote control circuit.

35. The assembly according to claim 27, further comprising an ignition interlock circuit connected to an ignition circuit of the recreational vehicle, wherein the microprocessor automatically closes at the awning in response to an ignition signal received from the ignition interlock.

36. The assembly according to claim 27, further comprising an audible alert, wherein the microprocessor activates the audible alert if one of the first temperature sensor and the second temperature sensor are not functioning properly.

37. The assembly according to claim 27, further comprising a sensor enable switch for selectively enabling and disabling the automatic closing of the awning by the microprocessor.

38. An automatic control assembly for controlling a first awning and a second awning of a recreational vehicle, the assembly comprising:
 a sensor housing comprising a housing base and a housing cover;
 a sensor mounting structure for removably receiving the housing;
 a wind speed sensing zone located between the housing base and the housing cover;
 a first thermistor for measuring a temperature of wind in the sensing zone, the first thermistor being positioned within the sensing zone;

a second thermistor for sensing a cooling effect over time of wind in the sensing zone, the second thermistor being positioned within the sensing zone;

a thermistor control circuit for heating the second thermistor to a predetermined temperature;

a first motor for opening and closing the first awning;

a second motor for opening and closing the second awning;

a first relay for selectively connecting power to one of the first motor and the second motor;

a second relay for selectively setting a polarity of the power to an awning opening polarity;

a third relay for selectively setting the polarity of the power to an awning closing polarity;

a speed selecting switch assembly for setting a threshold wind speed;

a wired remote control for opening and closing of the first awning and the second awning;

a wireless remote control circuit for opening and closing of the first awning and the second awning;

an ignition interlock circuit connected to an ignition circuit of the recreational vehicle;

an audible alert;

a microprocessor for causing the first relay, the second relay and the third relay to control the opening and closing of the first awning and the second awning in response to inputs received from the wired remote control and the wireless remote control circuit, wherein the microprocessor repeatedly receives input from the first thermistor and the second thermistor, repeatedly retrieves a corresponding wind speed value from a lookup table, repeatedly stores the corresponding wind speed value in a cumulative table, repeatedly calculates a cumulative average wind speed value from the cumulative table and automatically causes at least one of the first awning and the second awning to close when the cumulative average wind speed value reaches or exceeds the threshold wind speed, wherein the microprocessor automatically closes at least one of the first awning and the second awning in response to an ignition signal received from the ignition interlock, and wherein the microprocessor activates the audible alert if one of the first thermistor and second thermistor are not functioning properly;

a power supply circuit for supplying operating power to the first motor, the second motor, the wireless remote control circuit, the thermistor control circuit and the microprocessor;

a first sensor enable switch for selectively enabling and disabling the automatic closing of the first awning by the microprocessor; and a second sensor enable switch for selectively enabling and disabling the automatic closing of the second awning by the microprocessor.

* * * * *